(12) United States Patent
Yoshida

(10) Patent No.: US 7,798,293 B2
(45) Date of Patent: Sep. 21, 2010

(54) TABLE CLAMP DEVICE

(75) Inventor: Makoto Yoshida, Niwa-gun (JP)

(73) Assignee: Okuma Corporation, Niwa-Gun (JP)

( * ) Notice: Subject to any disclaimer, the term of this patent is extended or adjusted under 35 U.S.C. 154(b) by 144 days.

(21) Appl. No.: 11/687,790

(22) Filed: Mar. 19, 2007

(65) Prior Publication Data
US 2007/0284798 A1 Dec. 13, 2007

(30) Foreign Application Priority Data
Mar. 31, 2006 (JP) .............................. 2006-099362

(51) Int. Cl.
*F16D 65/00* (2006.01)
*B66D 5/26* (2006.01)
(52) U.S. Cl. .................... 188/73.1; 188/71.5; 188/72.4; 188/73.2; 248/636
(58) Field of Classification Search ................ 188/71.5, 188/151 R, 72.1, 72.3, 72.4, 73.31, 206 R; 269/86, 216, 254 R; 248/636, 638
See application file for complete search history.

(56) References Cited

U.S. PATENT DOCUMENTS 2,561,445 A * 7/1951 McCune ....................... 188/59
6,056,097 A * 5/2000 Hofer et al. ............... 192/58.41
6,405,835 B1 * 6/2002 Satou et al. ................ 188/71.5

FOREIGN PATENT DOCUMENTS

| JP | 2000136978 A | * | 5/2000 |
| JP | 2001-121369 | | 5/2001 |
| SU | 679301 A | * | 8/1979 |
| SU | 1379076 A | * | 3/1988 |
| SU | 1763081 A2 | * | 9/1992 |

* cited by examiner

Primary Examiner—Melody M Burch
(74) Attorney, Agent, or Firm—Burr & Brown

(57) ABSTRACT

A clamp device is provided that can prevent a table from being tilted at the time of clamping, can suppress a displacement in an axial direction at the time of clamping to a minimum, and also can be suitably used for a table unit with its table swiveling at a high speed. A table has fixedly attached thereto a braking plate swiveling with the table. A frame has fixedly attached thereto fixing plates having inner flange portions protruding to a swiveling axis side of the table with a predetermined pitch so that the inner flange portions interpose the braking plate. Moreover, a hydraulic cylinder having a clamp piston freely movable between a clamp position at which the braking plate is clamped and an unclamp position at which the clamp state is released is provided with the flame.

2 Claims, 3 Drawing Sheets ated with a sufficient space. Therefore, the fixing plates and the braking plate do not make contact with each other at the time of normal swiveling of the table. As a result, even with a table unit with its table swiveling at a high speed, the table clamp device can be suitably used.

TABLE CLAMP DEVICE

BACKGROUND OF THE INVENTION

This application claims the benefit of Japanese Patent Application Number 2006-99362 filed on Mar. 31, 2006, the entirety of which is incorporated by reference.

FIELD OF THE INVENTION

The present invention relates to a table clamp device (hereinafter simply referred to as a clamp device) for positioning and fixing a table, which is mounted to a machine tool and the like and can swivel around a predetermined axis, at a predetermined swivel position.

DESCRIPTION OF THE RELATED ART

As a general swiveling mechanism of a table on machine tools, a worm gear mechanism has been adopted. However, according to the worm gear mechanism, when the table is in a stop state, a looseness occurs by the amount of backlash. As a result, a deviation in positioning accuracy occurs and process accuracy is deteriorated, which are problematic. To solve this problem, conventionally, various clamp devices capable of clamping the table with no looseness caused by the backlash have been devised (for example, the one disclosed in the Japanese Patent Laid-Open Publication No. 2001-121369).

Here, one example of a clamp device conventionally adopted is described based on FIG. 3. FIG. 3 is an explanatory drawing of a conventional clamp device.

The reference number 51 denotes a housing of a table unit that swivelably supports a table 53 via bearings 52 around an A axis. On a lower side of the housing 51, a hydraulic cylinder 56 is fixedly attached via a base 55. With a hydraulic pressure provided from an "a" side or a "b" side of the hydraulic cylinder 56, a clamp piston 57 can move up and down between a clamp position and an unclamp position. Also, at an upper position of the clamp piston 57, a plurality of fixed circular plates 58, 58, . . . are fixedly attached to a base 55 so as to be engaged with a spindle portion of the table 53 with predetermined spaces. On the other hand, the spindle portion of the table 53 has mounted thereon a plurality of rotational circular plates 59, 59, . . . so that each rotational circular plate 59 is positioned between the fixed circular plates 58, 58, . . . . Here, the reference number 54 denotes a worm gear mechanism serving as a swiveling mechanism of the table 53.

In the clamp device as described above, when a control device and a driving device not shown have the table 53 set to a desired swiveling position, a hydraulic pressure is supplied from the "b" side in the hydraulic cylinder 56 to move the clamp piston 57 upward, pressing the fixed circular plates 58, 58, . . . and the rotational circular plates 59, 59, . . . upward. As a result, each rotational circular plate 59 is interposed between the fixed circular plates 58, 58, . . . . With a friction force occurring between the fixed circular plates 58, 58, . . . and the rotational circular plates 59, 59, . . . , the table 53 can be clamped. On the other hand, to swivel the table 53 again, a hydraulic pressure is supplied from the "a" side of the hydraulic cylinder 56 to move down the clamp piston 57 to be in an unclamp state.

SUMMARY OF THE INVENTION

As described above, the conventional clamp device adopts a configuration such that, with the fixed circular plate 58 and the rotational circular plate 59 being pressed upward, both are made contact each other to clamp the table 53. However, since the fixed circular plate 58 and the rotational circular plate 59 are in a shape of circular plates, it is not likely that they are easily deformed when pressed upward by the clamp piston 57, thereby causing a counterforce in a clamp direction. Thus, a desired clamping force cannot be easily obtained. Moreover, due to difficulty in deformation, a distortion or the like tends to occur to the circular plate when it is pressed upward. As a result, the table 53 is tilted at the time of clamping, or the table 53 is significantly displaced in an axial direction. Furthermore, since a space between the fixed circular plate 58 and the rotational circular plate 59 has to be set narrow, the fixed circular plates 58 and the rotational circular plates 59 tend to make contact with each other at the time of normal swiveling of the table 53. Therefore, the conventional clamp device has a problem of being not easily adopted to a table unit or the like that swivels at a high speed.

The present invention has been devised in view of the above problems, and an object is to provide a clamp device preventing a table from being tilted at the time of clamping, suppressing a displacement in an axial direction at the time of clamping to a minimum, and also suitably usable for a table unit with its table swiveling at a high speed.

To achieve the above object, the present invention is directed to a table clamp device for clamping a table of a table unit at a predetermined swiveling position. The table unit has a housing for supporting the table freely swivelably around a predetermined axis. The table clamp device includes at least one braking plate fixedly attached to the table for swiveling with the table, and at least a pair of fixing plates having inner flange portions protruding to a swiveling axis side of the table with a predetermined pitch. The fixing plates are fixedly attached so that the inner flange portions interpose the braking plate. The table clamp device includes a fluid pressure cylinder having a clamp piston movable between a clamp position at which the inner flange portions are pressed to the braking plate and an unclamp position at which a pressure to the inner flange portions is released. The fluid pressure cylinder is mounted so as to be movable in a clamp direction and is pressed to a clamp side via a shock absorbing mechanism.

According to the present invention, the configuration is such that the fixing plate is provided with inner flange portions protruding to a swiveling axis side of the table with a predetermined pitch, and the braking plate is interposed between the inner flange portions. Therefore, compared with the conventional configuration in which successive circular plates are adopted as fixing plates, the inner flange portions, which can deform easily as they are intermittently provided, reliably abut on the braking plate when pressured by the clamp piston. Therefore, a desired clamping force can be obtained, and the table can be more reliably clamped.

Also, the fixing plates having the inner flange portions that tend to deform compared with the conventionally-adopted successive circular plates are adopted. Therefore, there is no worry about twisting or bending of the entire fixing plates due to a counter-clamping force when the clamp piston is pressured. Thus, in a clamping state (a state where the fixing plates are pressed to the braking plate), such situations do not arise that the table is tilted or the position of the table is significantly displaced in an axial direction. Therefore, the present clamp device can improve positioning accuracy and, consequently, can contribute to an improvement in processing accuracy.

Furthermore, with the fixing plates having the inner flange portions that tend to deform being adopted, a space between the fixing plate and the braking plate can be increased. Therefore, the fixing plate and the braking plate can be mounted with a sufficient space so that the fixing plate and the braking plate do not make contact with each other at the time of swiveling even if the table is swiveled at a high speed (that is, the present invention can be suitably used for the table unit swiveling at a high speed).

Still further, the fluid pressure cylinder is mounted via the shock absorbing mechanism on the housing so as to be freely movable in a clamp direction and be in a state of being pressed to the clamp side. Therefore, the clamping force exerted when the table is clamped can be absorbed by the shock absorbing mechanism. That is, since the clamping force is not directly transferred to the housing, the load on the housing can be reduced even if the clamping force is increased when, for example, the table has to be firmly clamped. Therefore, worries that inconvenience occurs to the housing can be reduced. In addition, with the shock absorbing mechanism being provided, durability of the housing and the table clamp device can also be increased.

DETAILED DESCRIPTION OF THE PREFERRED EMBODIMENT

Hereinafter, the clamp device according to one embodiment of the present invention is described based on the drawings.

Figure 1:
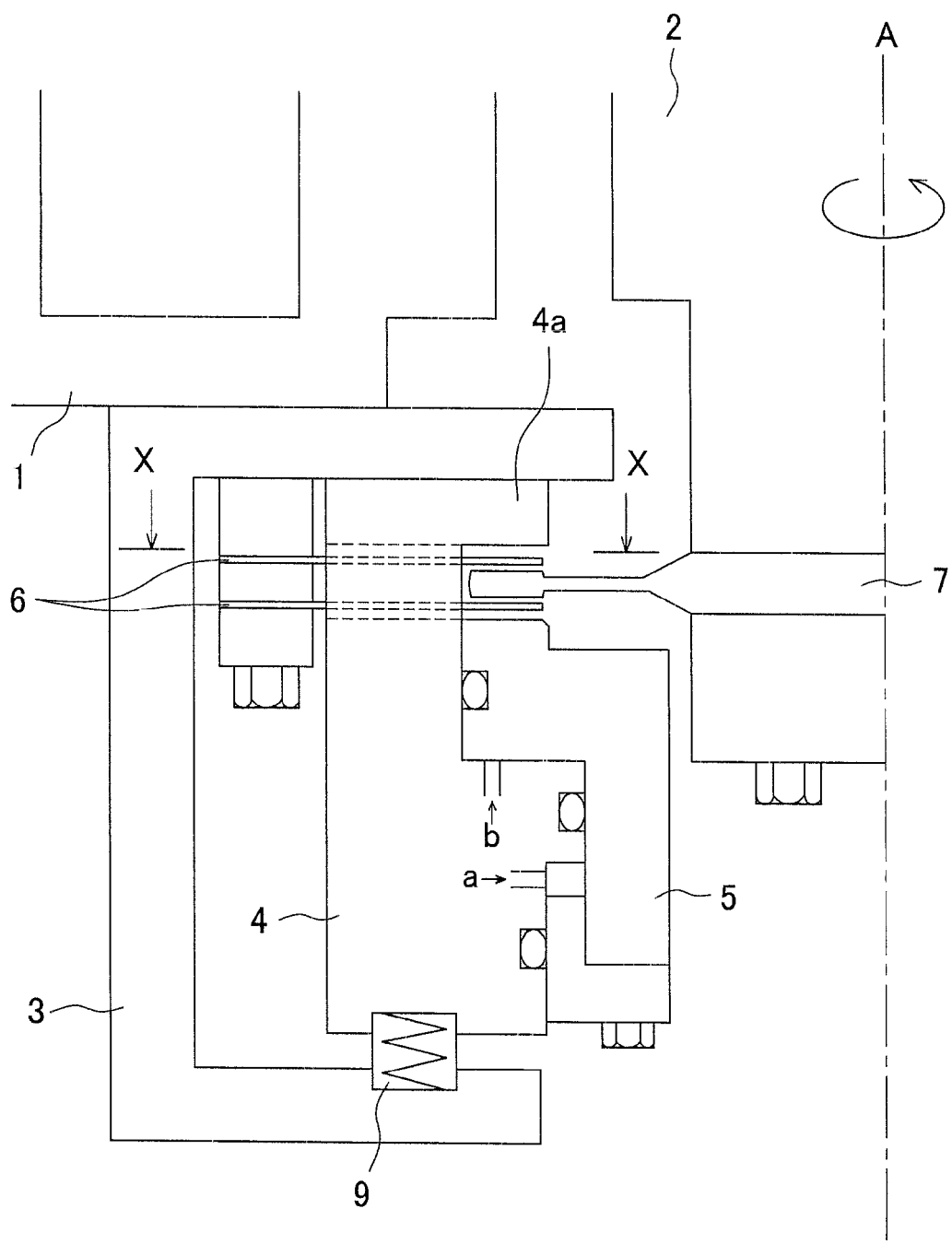
FIG. 1 is an explanatory drawing of a clamp device according to the present embodiment.
Figure 2:
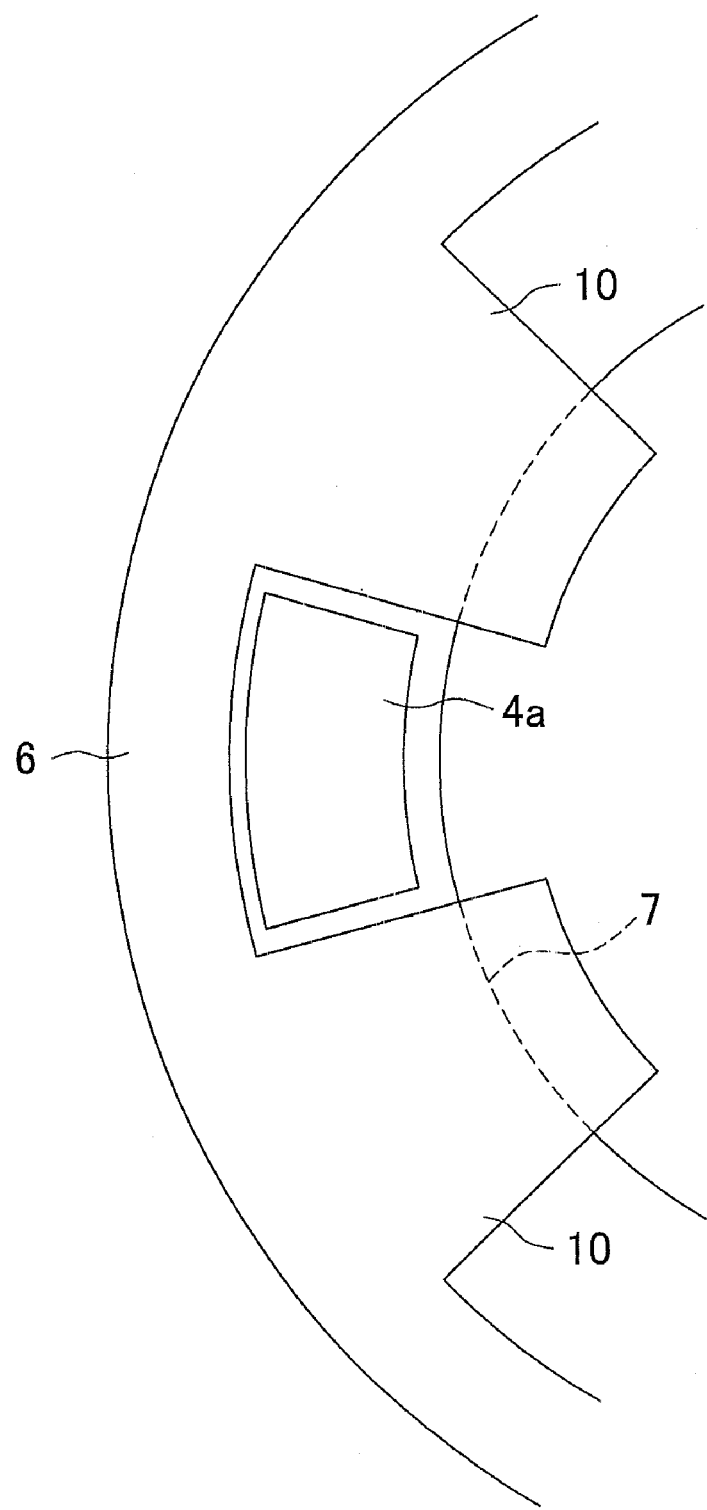
FIG. 2 is an explanatory drawing of a fixing plate viewed from an X side.
Figure 3:
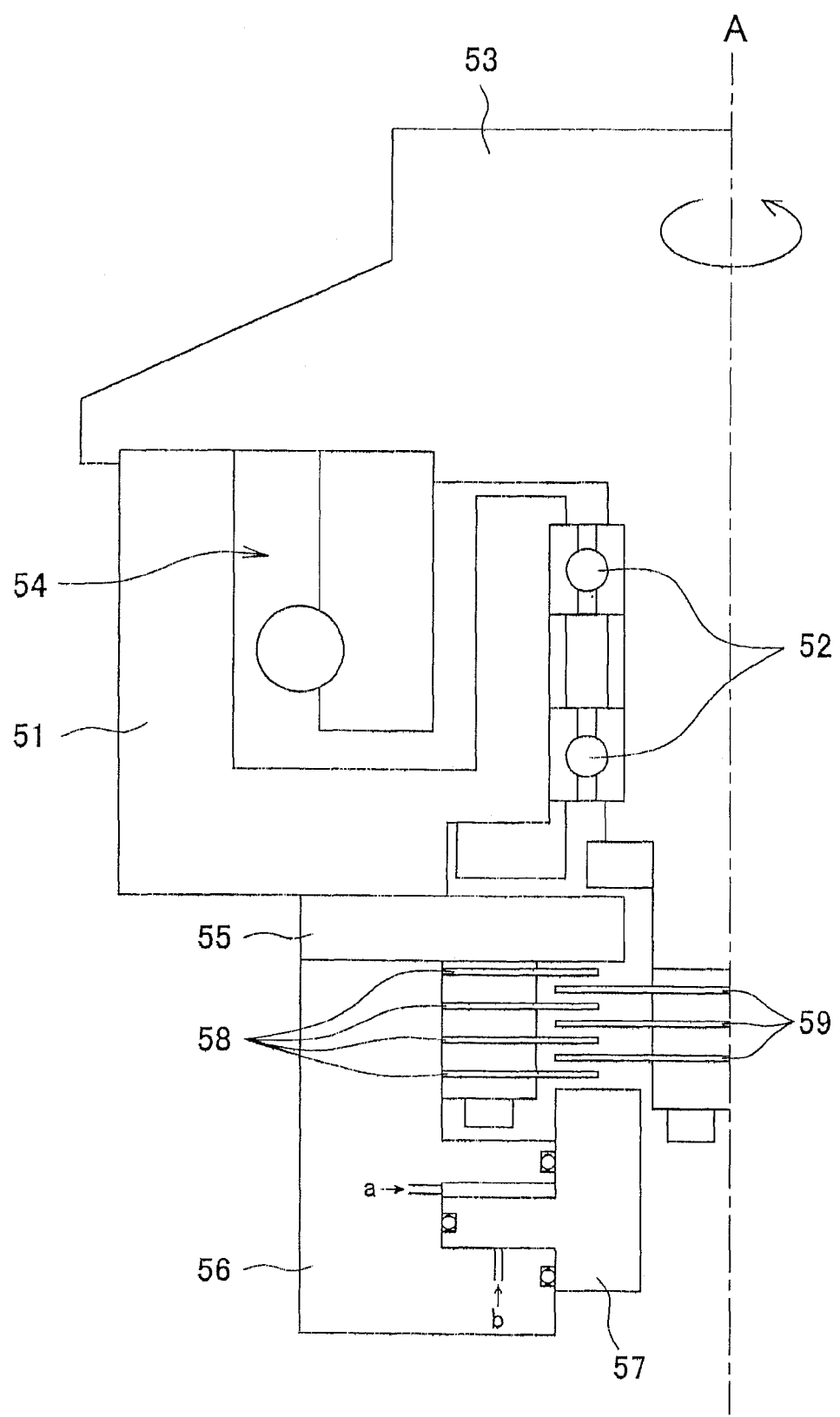
FIG. 3 is an explanatory drawing of a conventional clamp device.

FIG. 1 is an explanatory drawing of the clamp device according to the present embodiment. FIG. 2 is an explanatory drawing of a fixing plate 6 viewed from an X side in FIG. 1.

The reference number 1 denotes a housing of a table unit mounted on a machine tool, for example, the housing swivelably and axially supporting a table 2 with bearings not shown around an A axis. The housing 1 has fixed thereto a clamp unit frame (hereinafter simply referred to as a frame) 3 with a vertical section being shaped in a square bracket. Inside the frame 3, a hydraulic cylinder 4 is mounted including a clamp piston 5 that moves up and down between a clamp position and an unclamp position with a hydraulic pressure supplied from an "a" side or a "b" side. The hydraulic cylinder 4 is mounted on a bottom surface of the frame 3 via a shock absorbing mechanism 9 having a spring and, in a normal unclamp state, is fixed inside the frame 3 in a state where an upper portion 4a is pressed onto a ceiling surface of the frame 3 due to a pressing force of the shock absorbing mechanism 9 (a state of being pressed to a clamp side).

Also, inside the frame 3, thin fixing plates 6, 6 are fixedly attached. Each fixing plate 6 includes, as shown in FIG. 2, a plurality of inner flange portions 10, 10, . . . protruding to a swiveling axis side of the table 2 with a predetermined pitch. With the upper portion 4a of the hydraulic cylinder 4 being interposed between the inner flange portions 10, 10, the inner flange portions 10 are fixedly attached so as to protrude from a piston perimeter side to an upward direction of the clamp piston 5.

On the other hand, on a spindle portion of the table 2, a braking plate 7 shaped in a circular plate is mounted so as to be positioned between the fixing plates 6, 6 above the clamp piston 5. Here, the fixing plates 6, 6 and the braking plate 7 are mounted with a sufficient space so that the braking plate 7 does not make contact with the upper and lower fixing plates 6, 6 even if it is swiveled at a high speed with the table 2.

The clamp operation of the table 2 by the above-structured clamp device is described.

When a control device or a driving device not shown has the table 2 set to a desired swiveling position, a hydraulic pressure is supplied from the "b" side of the hydraulic cylinder 4 to move the clamp piston 5 upward to a clamping position. Then, the state becomes such that the inner flange portions 10, 10, . . . of the lower-side fixing plate 6 and the braking plate 7 are pressed onto the inner flange portions 10, 10, . . . of the upper-side fixing plate 6 by the upper surface of the clamp piston 5. With a friction force occurring on a contact plane between the inner flange portions 10, 10, . . . and the braking plate 7, the braking plate 7, that is, the table 2, is clamped at the desired swiveling position. Also at this time, the hydraulic cylinder 4 is forced downward by a hydraulic pressure supplied from the "b" side (in a counter-clamp direction) to moves lightly downward against the pressing force of the shock absorbing mechanism 9. Then, a space is formed between the upper portion 4a of the hydraulic cylinder 4 and the ceiling surface of the frame 3, that is, the hydraulic cylinder 4 is supported only by the shock absorbing mechanism 9 inside the frame 3.

On the other hand, if the table 2 is desired to be swiveled again, a hydraulic pressure is supplied from the "a" side of the hydraulic cylinder 4 to move down the clamp piston 5 to the unclamp position. Due to this, an unclamp state occurs in which the fixing plates 6, 6 and the braking plate 7 are separated from one another, whereby the table 2 can swivel freely. Also, the hydraulic cylinder 4 moves upward with a hydraulic pressure supplied from the "a" side, thereby causing a normal state in which the upper portion 4a is pressed onto the ceiling surface of the frame 3 by the pressing force of the shock absorbing mechanism 9.

According to the clamp device as described above, the configuration is such that the fixing plate 6 is provided with the plurality of inner flange portions 10, 10, . . . protruding with the predetermined pitch to the swiveling axis side of the table 2 and, with the clamp piston 5 being pressed to the inner flange portions 10, 10, . . . , the braking plate 7 is clamped. Therefore, compared with the conventional configuration in which successive circular plates are adopted as fixing plates, the inner flange portions 10, 10, . . . , which can deform easily as they are intermittently provided, reliably abut on the braking plate 7. Therefore, a desired clamping force can be obtained, and the table 2 can be more reliably clamped.

Also, in the clamp device according to the present embodiment, the inner flange portions 10, 10, . . . that tend to deform compared with the successive circular plates conventionally adopted are provided. Therefore, twisting, bending, or the like due to a counter-clamping force tends not to occur to the fixing plates 6, 6. Thus, in a clamp state, such situations do not arise that the table 2 is tilted or is significantly displaced in an axial direction. Therefore, the clamp device can improve positioning accuracy and, consequently, can contribute to an improvement in processing accuracy.

Furthermore, with the fixing plates 6, 6 having the inner flange portions 10, 10, . . . that tend to deform being adopted, a space between the fixing plate 6 and the braking plate 7 can be increased compared with the conventional technology. Therefore, the fixing plate 6 and the braking plate 7 can be mounted with a sufficient space so that the fixing plate 6 and the braking plate 7 do not make contact with each other even if the table 2 is swiveled at a high speed (that is, the clamp device can be suitably used for the table unit including the table 2 swiveling at a high speed).

Still further, the hydraulic cylinder 4 is mounted inside the frame 3 via the shock absorbing mechanism 9, and the upper portion 4a of the hydraulic cylinder 4 and the ceiling surface of the frame 3 are not contacted to each other. Therefore, when the table 2 is clamped, the hydraulic cylinder 4 is pressed downward against the pressing force of the shock absorbing mechanism 9 to create a space between the upper portion 4a of the hydraulic cylinder 4 and the ceiling surface of the frame 3, and the hydraulic cylinder 4 becomes to be supported only by the shock absorbing mechanism 9. That is, when the table 2 is clamped, the pressure of the clamp piston 5 is not directly transferred to the frame 3, and external forces more than the pressing force of the shock absorbing mechanism 9 are prevented from being exerted onto the frame 3. Therefore, even if the pressure of the clamp piston 5 is increased when, for example, the table 2 has to be firmly clamped, there is no worry about occurrence of any problem to the frame 3. In addition, with the shock absorbing mechanism 9 being provided, durability of the frame 3 can also be increased.

In addition, in a normal state, the upper portion 4a of the hydraulic cylinder 4 is pressed onto the ceiling surface of the frame 3 by the pressing force of the shock absorbing mechanism 9. Therefore, inside the frame 3, the hydraulic cylinder 4 can be reliably supported with no looseness.

Here, the configuration of the clamp device of the present invention is not restricted to the embodiment described above. The configuration regarding the mounting position, the number of components to be mounted, the shape, the size, and others of the frame, the hydraulic cylinder, the fixing plates, the braking plate, the clamp piston, the shock absorbing mechanism and others can be appropriately modified as required within a scope not deviating from the gist of the present invention.

For example, although the configuration in the above embodiment is such that the braking plate is clamped by moving the clamp piston upward, the configuration may be such that the brake is clamped by moving the clamp piston downward. Also, such a configuration is possible that clamp pistons in pair are provided at upper and lower positions of the fixing plate for clamping in a manner such that the fixing plate is interposed between the clamp pistons.

Also, as a matter of course, a configuration of a multi-plate type as in the conventional technology is possible such that a plurality of fixing plates and a plurality of braking plates are provided. Furthermore, the shape, pitch, and others of the inner flange portions provided to the fixing plate can be modified as appropriate. For example, in the device according to the present embodiment, a pitch of the inner flange portions with respect to the upper-side fixing plate and with respect to the lower-side fixing plate may be different from each other.

Still further, although the housing of the table unit and the frame of the clamp device are separate members in the above embodiment, as a matter of course, part of the table unit can be configured as the frame of the clamp device.

In addition, the clamp device according to the present invention can be applied to various types of table, such as a table for setups of replacing a work after processing with a work before processing and a table on which a work is placed in a cutting space or the like.

What is claimed is:

1. A table clamp device for clamping a table of a table unit at a predetermined swiveling position, the table unit having a housing for supporting the table freely swivelably around a predetermined axis, the table clamp device comprising:
   at least one successively circular braking plate fixedly attached to the table for swiveling with the table;
   at least a pair of deformable fixing plates having inner flange portions protruding toward a swiveling axis side of the table to a diameter that is smaller than an outer diameter of said at least one successively circular braking plate and cutout portions extending to a diameter that is larger than the outer diameter of said at least one successively circular braking plate, wherein the deformable inner flange portions and the cutout portions are alternately provided with a predetermined pitch in an inner peripheral direction, the fixing plates being fixedly attached to the housing so that only the deformable inner flange portions overlap said at least one successively circular braking plate; and
   a fluid pressure cylinder having a clamp piston freely movable between a clamp position at which the deformable inner flange portions are pressed to said at least one successively circular braking plate and an unclamp position at which a pressure to the deformable inner flange portions is released, wherein the fluid pressure cylinder is mounted so as to be movable in a clamp direction and is pressed to a clamp side via a shock absorbing mechanism.

2. A table clamp device for clamping a table of a table unit at a predetermined swiveling position, the table unit having a housing for supporting the table freely swivelably around a predetermined axis, the table clamp device comprising:
   at least one successively circular braking plate fixedly attached to the table for swiveling with the table;
   at least a pair of deformable fixing plates having inner flange portions protruding toward a swiveling axis side of the table to a diameter that is smaller than an outer diameter of said at least one successively circular braking plate and cutout portions extending to a diameter that is larger than the outer diameter of said at least one successively circular braking plate, wherein the cutout portions have a width amount along said larger diameter of the cutout that is greater than a width amount of the cutout at said smaller diameter, and resilient inner flange deformable engagement portions are formed proximate said smaller diameter, wherein the inner flange portions and the cutout portions are alternately provided with a predetermined pitch in an inner peripheral direction, the fixing plates being fixedly attached to the housing so that only the inner flange deformable engagement portions overlap and overlap said at least one successively circular braking plate; and
   a fluid pressure cylinder having a clamp piston freely movable between a clamp position at which only the resilient inner flange deformable engagement portions are pressed to said at least one successively circular braking plate and an unclamp position at which a pressure to the resilient inner flange deformable engagement portions is released, wherein the fluid pressure cylinder is mounted so as to be movable in a clamp direction and is pressed to a clamp side via a shock absorbing mechanism.

* * * * *